United States Patent [19]

Ream et al.

[11] Patent Number: 5,011,282

[45] Date of Patent: Apr. 30, 1991

[54] LASER BEAM PATH ALIGNMENT APPARATUS FOR LASER PROCESSING MACHINES

[75] Inventors: Stanley L. Ream, Charlottesville, Va.; C. S. Lee, Torrance, Calif.; G. C. Lim, Cerritos, Calif.; Kenneth Fukae, Westminster, Calif.

[73] Assignee: Amada Company, Limited, Japan

[21] Appl. No.: 438,842

[22] Filed: Nov. 16, 1989

[51] Int. Cl.$^5$ .............................................. G01B 11/26
[52] U.S. Cl. ..................................... 356/153; 356/400; 219/121.78; 219/121.79; 219/121.83
[58] Field of Search ....................... 356/152, 153, 400; 219/121.78, 121.79, 121.80, 121.81, 121.83

[56] References Cited

U.S. PATENT DOCUMENTS

| | | | |
|---|---|---|---|
| 4,520,261 | 5/1985 | Tsutsumi | 219/121.83 |
| 4,574,180 | 3/1986 | Kasner et al. | 219/121.78 |
| 4,576,480 | 3/1986 | Travis | 356/153 |
| 4,618,759 | 10/1986 | Müller et al. | 219/121.78 |
| 4,707,596 | 11/1987 | Hohberg | 219/121.78 |
| 4,918,284 | 4/1990 | Weisz | 219/121.78 |

FOREIGN PATENT DOCUMENTS

| | | | |
|---|---|---|---|
| 141724 | 5/1985 | European Pat. Off. | 219/121.81 |
| 78696 | 3/1989 | Japan | 219/121.81 |
| 2184831 | 7/1987 | United Kingdom | 219/121.79 |

Primary Examiner—F. L. Evans
Attorney, Agent, or Firm—Wigman & Cohen

[57] ABSTRACT

To automatically align a laser beam path with respect to an axis along which a movable carriage of a laser processing machine moves, the apparatus of this invention comprises means for detecting laser beam position at least when the carriage is positioned at a first and a second position, means for displaying the detected laser beam positions, and means for adjusting the mirror tilt angle. In the apparatus, the laser beam path is aligned with respect to the axis by actuating the mirror tilt angle adjusting means so that the second laser beam position on the display means is moved to coinside with the first laser beam position. The apparatus of this invention may comprise, instead of the display means, means for calculating an inclination angle of the laser beam with respect to the axis, based on the distance between the first and the second position, and distance between the first and the second laser beam position.

6 Claims, 14 Drawing Sheets

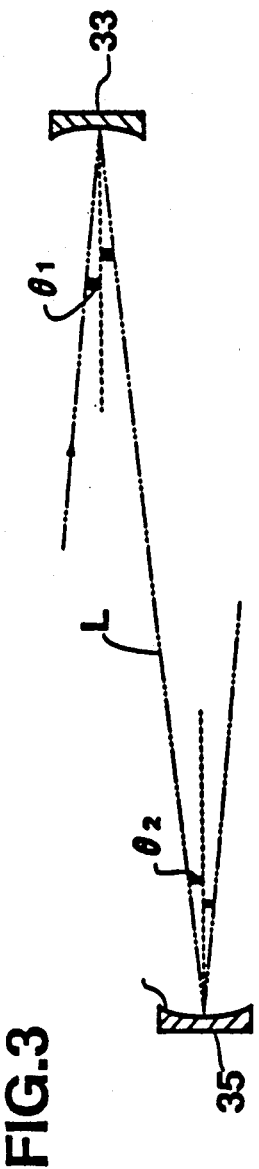
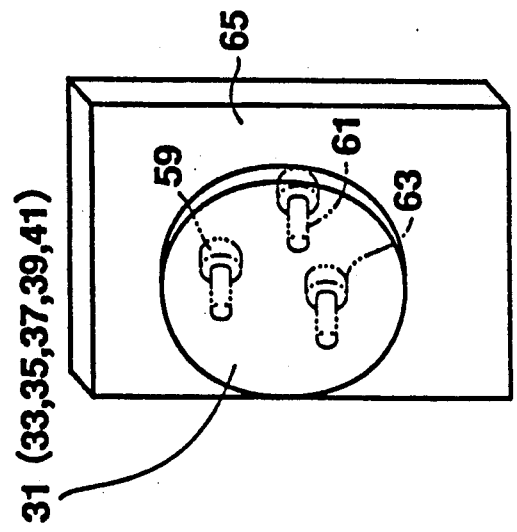
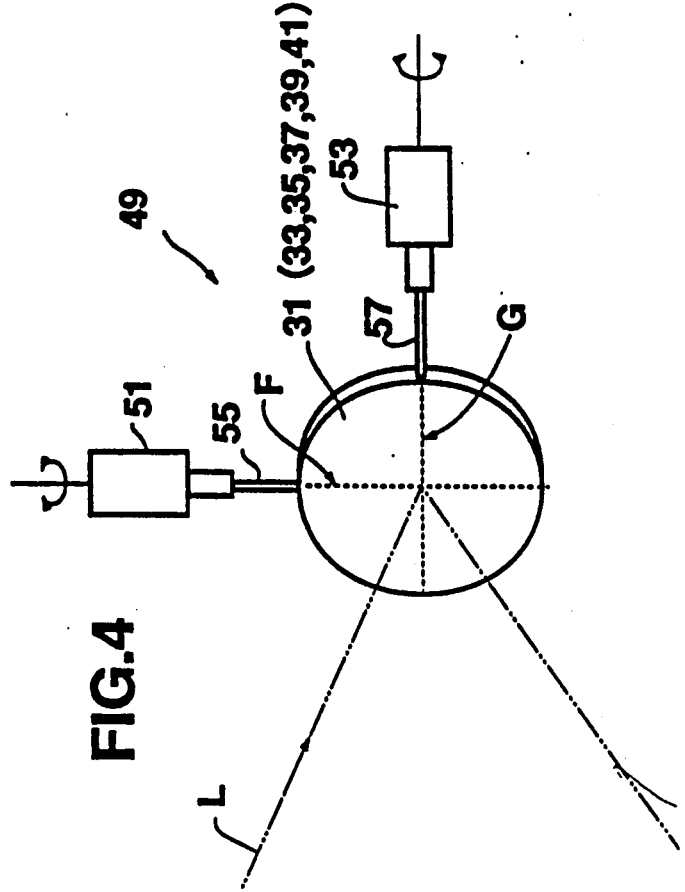
FIG.3
FIG.5
FIG.4

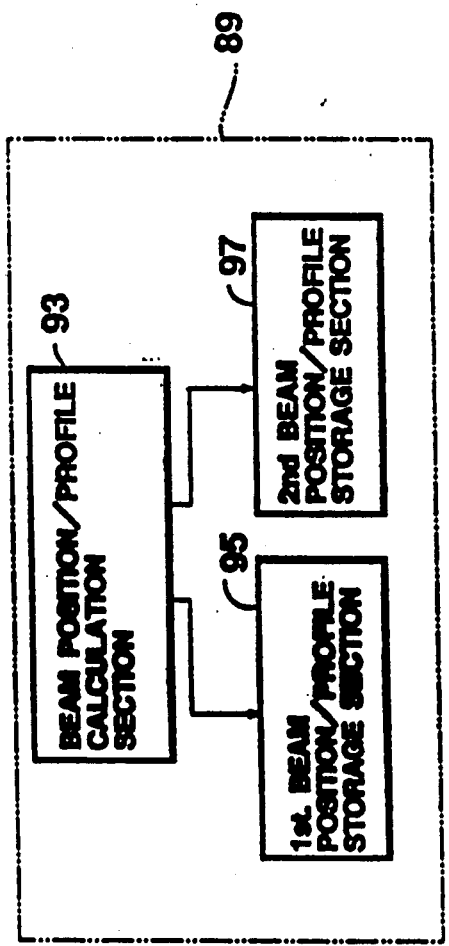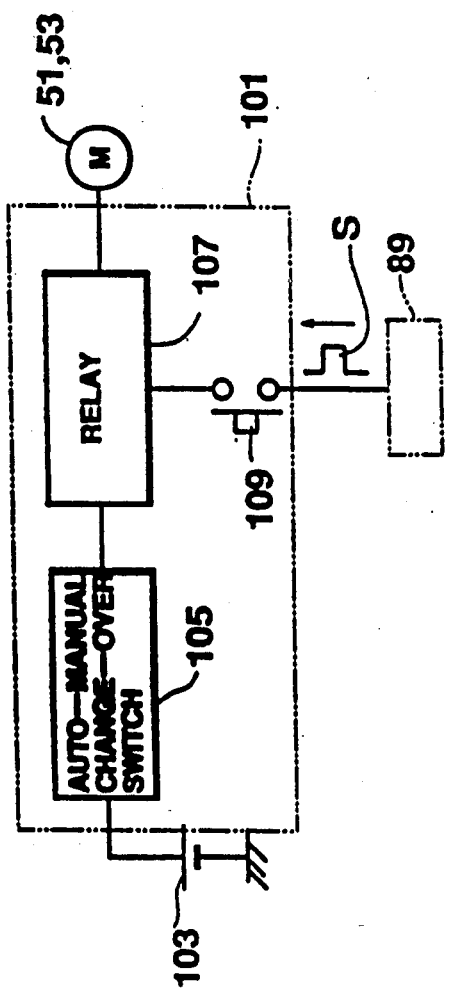

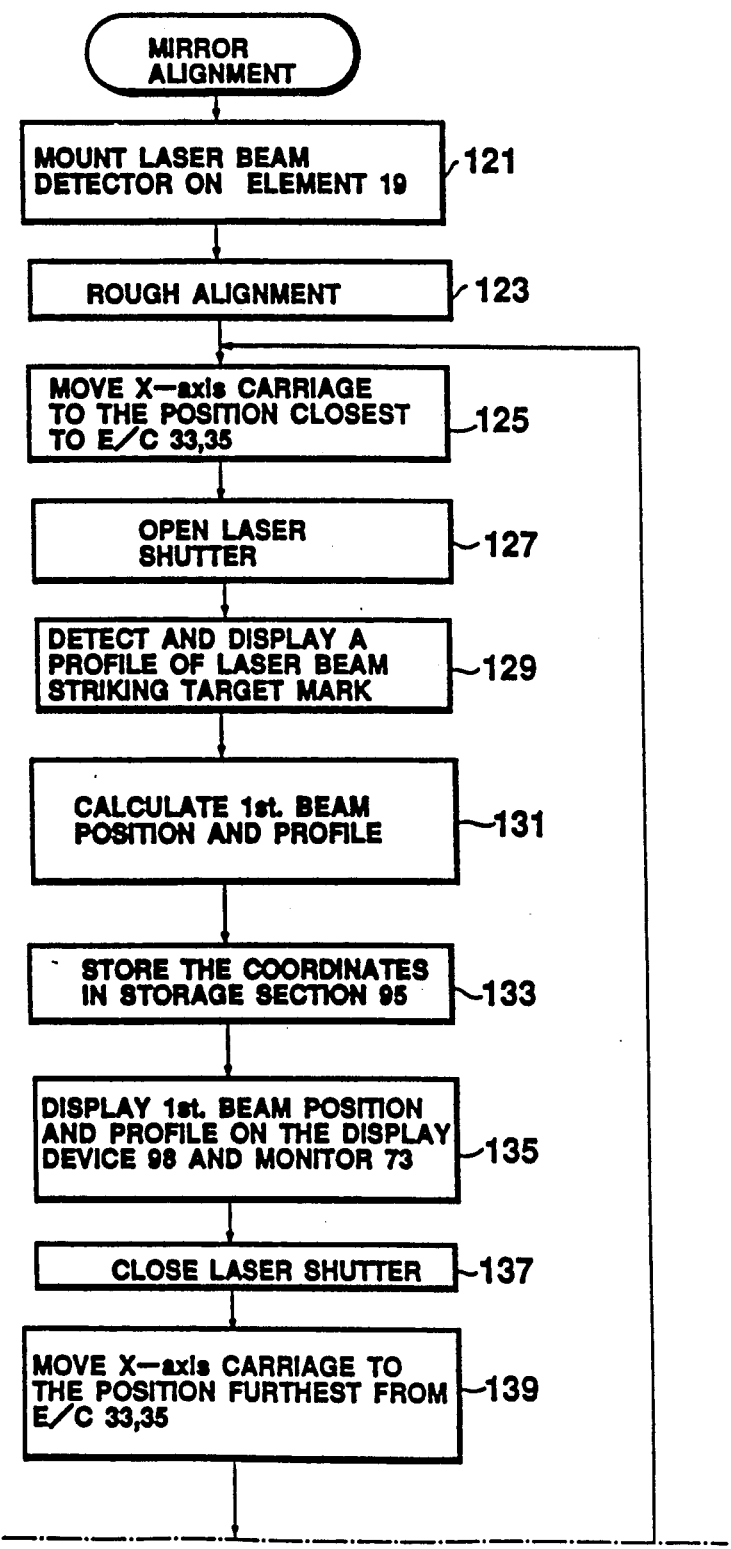

FIG.19A
FIG.19
| FIG.19A |
| FIG.19B |
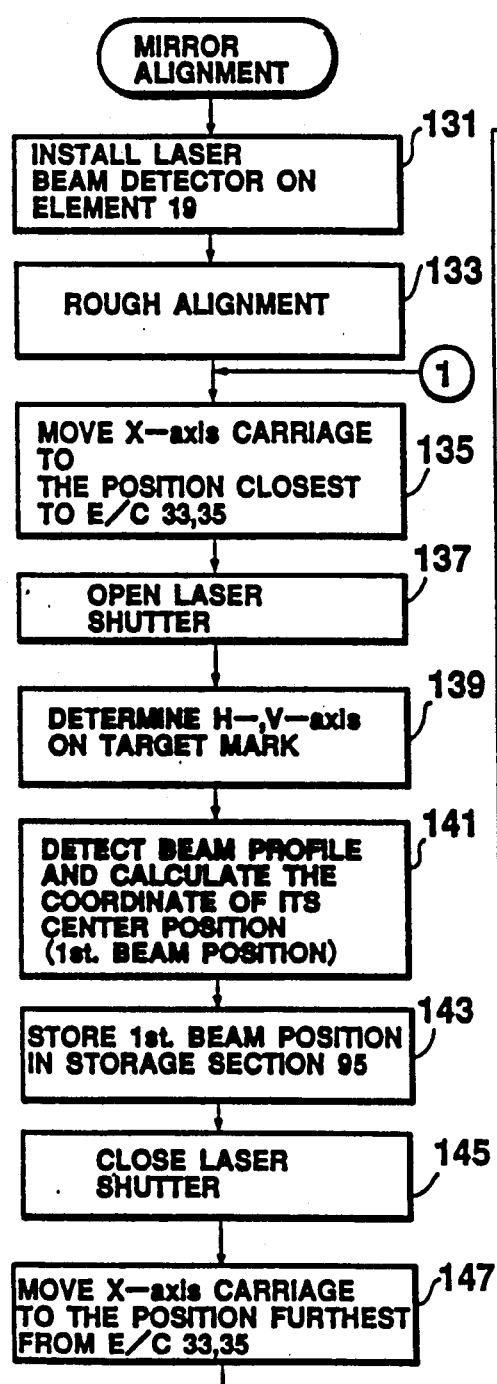
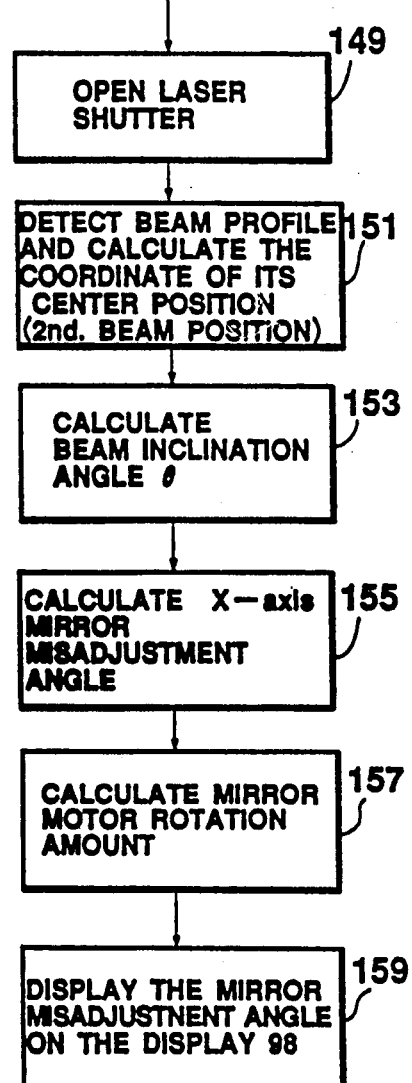

LASER BEAM PATH ALIGNMENT APPARATUS FOR LASER PROCESSING MACHINES

BACKGROUND OF THE INVENTION

1. Field of the Invention

The present invention relates to a laser beam path alignment apparatus, and in particular to a laser beam path alignment apparatus for multi-axis laser processing machines.

2. Description of the Prior Art

In the field of materials processing, the range of tasks that can now be performed by lasers is simply astounding. Consequently, it is not surprizing to see that a vast number of laser processing machines have been developed to perform extremely intricate and precise processing work.

Naturally, in order to effectively perform laser processing work, it is necessary to control very accurately the position of the laser beam at the processing location. When processing involves profiling, as most processing work does, this translates into two separate tasks: controlling the position of the focusing lens of the laser processing machine with respect to the workpiece, and centering the laser beam before it passes out through the focusing lens.

With regards to the first requirement, there are several well-known mechanical means for controlling the position of the focusing lens. Perhaps the most common way is to mount the focusing lens on the tip of a processing head made movable by mechanical arms.

Now, as for the requirement of centering the laser beam before it passes out through the focusing lens, it is necessary for the laser beam to remain perfectly aligned along each and every path it takes from the laser source to the focusing lens during the entire processing procedure. In other words, as the processing head moves along the axes of the laser processing machine, the laser beam must constantly maintain alignment along those axes.

In order to cause the laser beam to maintain alignment along the axes, in the laser processing machine, there are provided mirrors for guiding the laser beam from the laser sources to the focusing lens, each of the mirrors being provided at an end of each axis thereof. For example, in the case of a laser processing device provided with a processing head which can move freely in three dimensions, at least three reflecting mirrors are provided. Specifically, an X-axis mirror is provided on the base end of an X-axis arm, a Y-axis mirror is provided on the base end of a Y-axis arm, and a Z-axis mirror is provided on the base end of a Z-axis arm.

In addition, the mirror provided at the end of each axis can be rotated around two mutually perpendicular axes situated on the surface of the mirror so that the reflected laser beam can be projected parallel to each axis in an accurate manner.

Accordingly, by adjusting the angles of these mirrors in sequence, beginning, for example, with the X-axis, it is possible to accurately adjust the laser beam path to run parallel to each axis. By this means, even if the arms move, the focal position of the laser beam does not move relative to the processing head.

However, in a conventional device the mirrors are adjusted manually. For example, one operator observes an output beam from beside the processing head while the other operator adjusts the mirror in accordance with former operational instructions. This must be done for each mirror, one at a time, in turn.

Accordingly, the adjustment of the laser beam is an extremely tedious and time consuming operation which can only be carried out by trained experts.

SUMMARY OF THE INVENTION

In view of the disadvantages of the prior art laser processing machines, it is an object of the present invention to provide a simple and accurate laser beam path alignment apparatus that can be operated with relative ease and speed.

It is another object of the present invention to provide a computerized laser beam path alignment apparatus that can be operated quickly with high accuracy.

In order to accomplish the above-mentioned objects, a first laser beam path alignment apparatus according to the present invention comprises means for detecting a laser beam position through which the laser beam passes, the laser beam position being defined in a plane perpendicular to the predetermined axis direction; means for storing a first laser beam position which is detected by the laser beams position detecting means in the case where the moving means is positioned at a first position in the predetermined axis direction; means for displaying the first laser beam position and a second beam position, the second laser beam position being detected by the laser beam position detecting means in the case where the moving means is positioned at a second position in the predetermined axis direction; and means for rotating the mirror about an axis lying in the surface of the mirror, whereby the second laser beam position is changed to coincide with the first laser beam position.

A second beam path alignment apparatus, according to the present invention comprises means for detecting a laser beam position through which the laser beam passes, the laser beam position being defined in plane perpendicular to the predetermined axis direction; means for storing a first laser beam position and a second laser beam position, the first laser beam position being detected by the laser beam position detecting means in the case where the moving means is positioned at a first position in the predetermined axis direction and the second laser beam position being detected by the laser beam position detecting means in the case where the moving means is positioned at a second position in the predetermined axis direction; means for calculating the distance between the first position and the second position of the moving means; and means for calculating an inclination angle of the laser beam with respect to the predetermined axis direction, based on the first and the second laser beam position, and the distance between the first and the second position of the movable member.

The foregoing, and other objects, features, and advantages of the present invention will become more apparent from the detailed description of the preferred embodiment taken in conjunction with the accompanying drawings.

BRIEF DESCRIPTION OF THE DRAWINGS

FIG. 3 is a sketch showing the angles of incidence of a laser beam as it is expanded and then collimated within the mirror arrangement shown in FIG. 2.

FIG. 4 is a simple sketch showing one example of a mirror adjustment means for the laser beam path alignment apparatus according to the present invention.

FIG. 5 is a simple sketch showing another example of a mirror adjustment means for the laser beam path alignment apparatus of the present invention.

FIG. 9 is a block diagram showing one embodiment of a main control section of the apparatus of FIG. 8.

FIG. 10 is a block diagram showing a mirror motor drive section of the apparatus of FIG. 8.

FIGS. 19A and 19B are flowcharts showing the operation of the second embodiment shown in FIG. 14.

DETAILED DESCRIPTION OF THE PREFERRED EMBODIMENTS

First, with reference to FIG. 1 a brief description of an embodiment of the present invention will be given together with a general description of a laser processing machine 1 for the purpose of visualizing the embodiment of the present invention in three dimensions.

Figure 1:
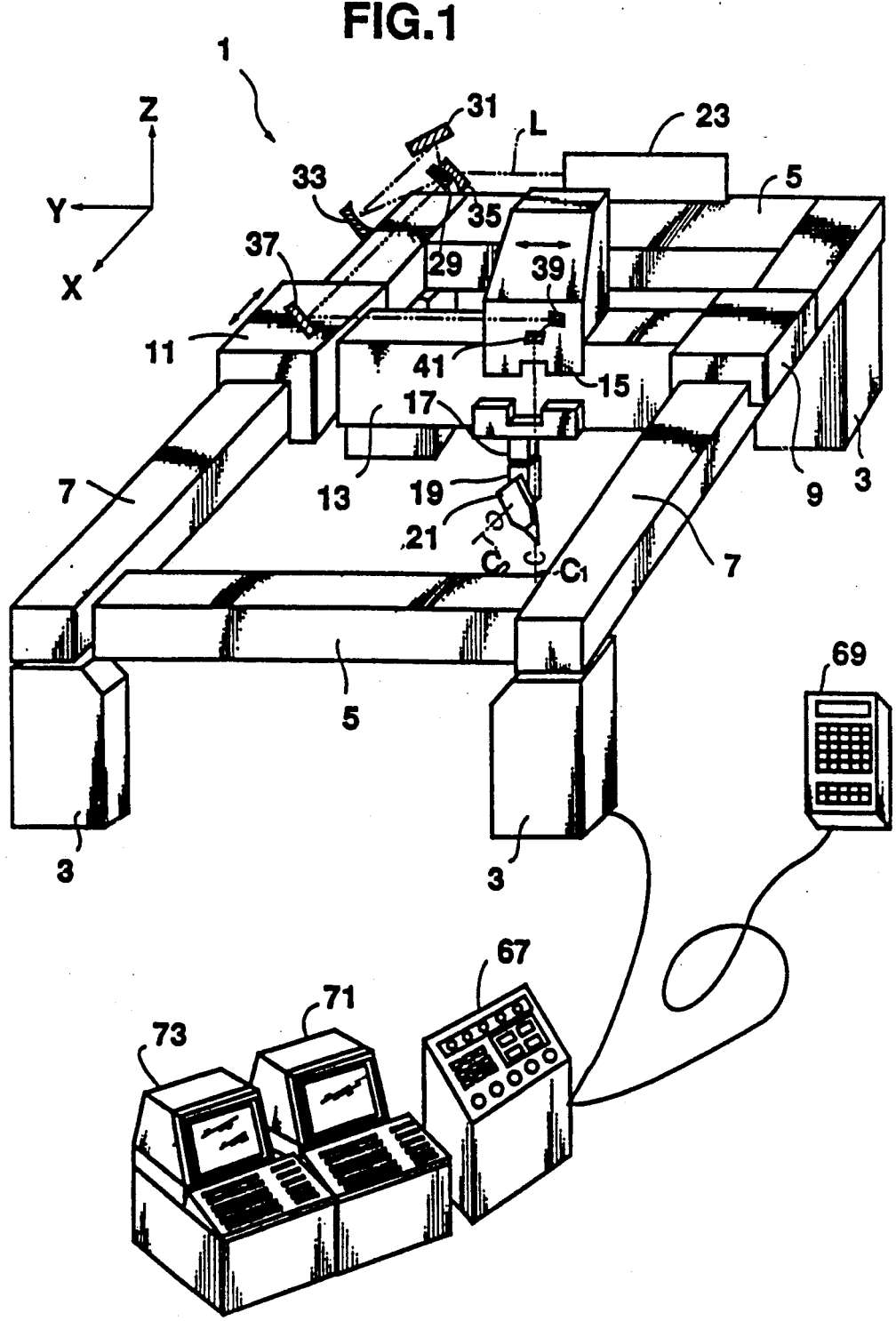
FIG. 1 is a perspective view showing an example of a laser processing machine in which an embodiment of a laser beam path alignment apparatus according to the present invention is generally shown.

To start off, as shown in FIG. 1, the laser processing machine 1 comprises four columns 3 that support two support members 5 and two X-axis guide sleeves 7, the X-axis guide sleeves 7 extending in an X-axis direction. Slidably supported by the X-axis guide sleeves 7 are X-axis carriage shoulders 9 and 11, between which is connected integrally an X-axis carriage 13 extending in the Y-axis direction. The X-axis carriage 13 in turn supports a Y-axis carriage 15 which is slidably mounted upon the X-axis carriage 13. Extending from the bottom of the Y-axis carriage 15 is a height-adjustable Z-axis column 17.

On the Z-axis column 17, an element 19 is mounted so as to be rotatable about a vertical axis $c_1$, and on the element 19 a laser processing head 21 is mounted so as to be rotatable about horizontal axis $c_2$.

Accordingly, in the laser processing machine 1, the laser processing head 21 can be moved in a three dimensional direction by moving the X-axis carriage 13 in a X-axis direction, the Y-axis carriage 15 in an Y-axis direction and the Z-axis column 17 in a Z-axis direction.

Further, by rotating the element 19 about the vertical axis $c_1$ and by rotating the laser processing head 21 about the horizontal axis $c_2$, the tip of the laser cutting head 21 can be directed in any directions in the three dimensional direction.

In order to generate a laser beam, a laser generator 23 is provided on the rear-side support member 5.

Specifically, the laser generator 23 includes a first laser oscillator such as a He-Ne laser oscillator for emitting a visible laser beam which is used in alignment of the laser beam path, and a second laser oscillator such as $CO_2$ laser oscillator for emitting high power laser beam which performs laser processing.

The laser generator 23 also includes an optical device which selectively outputs either one of the visible and high power laser beams from the first or the second laser oscillator along a predetermined output optical path.

Figure 2:
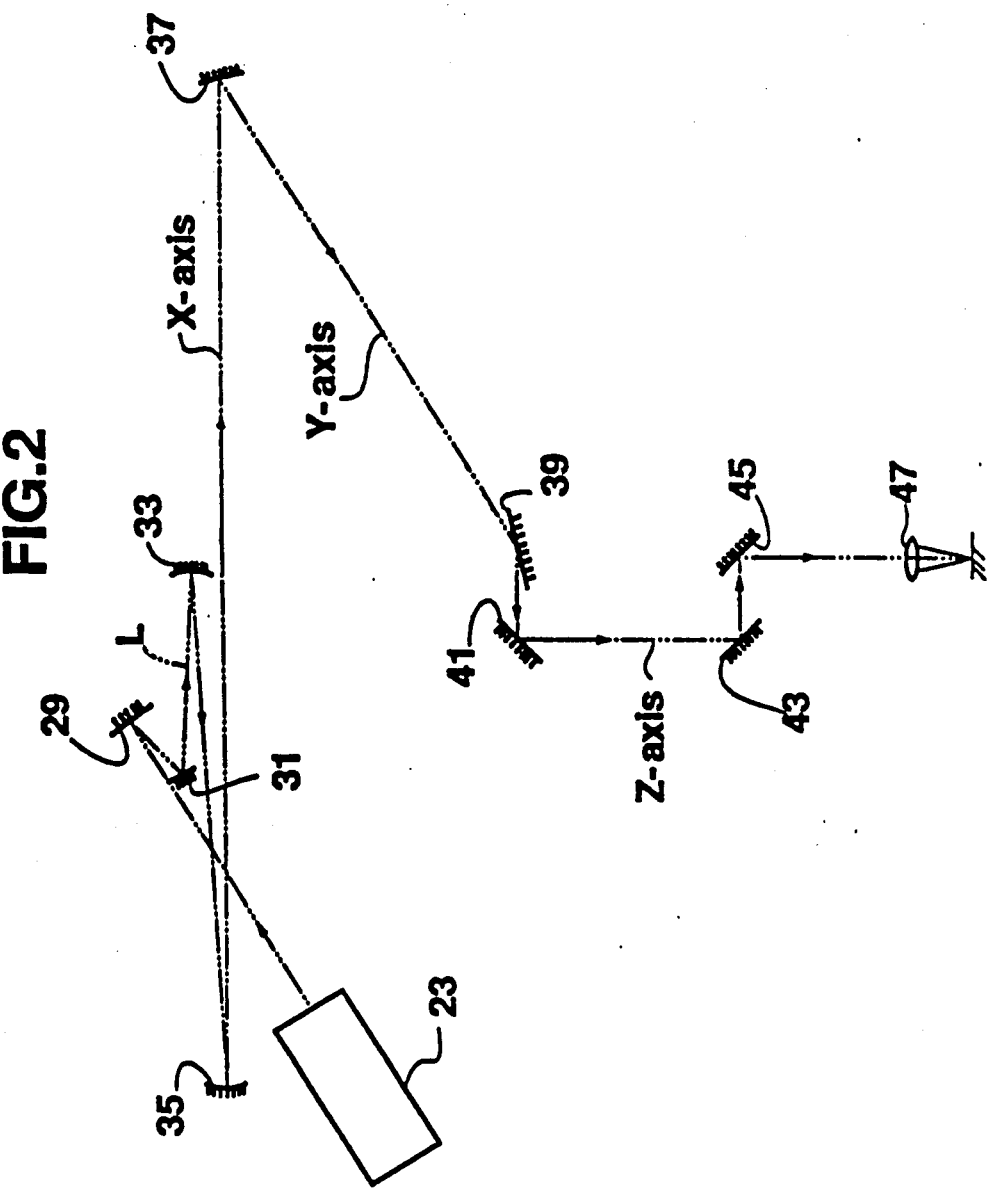
FIG. 2 is a simple schematical view of a mirror arrangement of the laser beam path alignment apparatus shown in FIG. 1.

Further, refering to FIG. 2 in addition to FIG. 1, an arrangement of mirrors are provided at specific locations within the laser processing machine 1 to guide the laser beam L from the laser generator 23 to the laser processing head 21.

Namely, on the rear most end of one of the X-axis guide sleeves 7, there is disposed a quarter-wave mirror 29 for circularly polarizing the laser beam from the laser generator 23, and a planar mirror 31 for reflecting the laser beam L from the quarter-wave mirror 29 toward a first concave mirror 33. The first concave mirror 33 serves to expand the laser beam L while reflecting it toward a second concave mirror 35 which then reflects and collimates the laser beam L along the X-axis (the first concave mirrors is made linearly adjustable so that the separation of the concave mirrors 33 and 35 can be adjusted to achieve the correct collimation). Thus, the first concave mirror 33 serves as an expander and the second concave mirror 35 serves as both a collimator and an X-axis directional mirror (hereinafter referred to as the X-axis mirror 35).

Referring to FIG. 3, in order to keep the overall beam aberration at less than 5 percent, the first concave mirror 33 and the X-axis directional mirror 35 are provided in such a way that the angles of incidence $\theta_1$ and $\theta_2$ are set to be less than 3° (degrees).

Referring again to FIGS. 1 and 2, after the laser beam L has been reflected by the X-axis mirror 35, it travels along the X-axis until striking a Y-axis mirror 37. The Y-axis mirror, being mounted on the X-axis carriage shoulder 11, then reflects the laser beam L along the Y-axis toward a Z-axis mirror 41 via a displacement mirror 39, both of which are provided within the Y-axis carriage 15. The displacement mirror 39 may serve to correct any lateral displacement of the laser beam L before it strikes the Z-axis mirror 41. Finally, the laser beam L, having stricken the Z-axis mirror 41, is reflected down through the Z-axis column 17 to the element 19 and the laser processing head 21. In the element 19 and the laser processing head 21, the laser beam L is reflected by a first head mirror 43 and a second head mirror 45 and is impinged upon the center of the focusing lens 47.

Referring now to FIG. 4, mirror tilt adjustment means 49 is provided on each of the mirrors 31, 33, 35, 37, 39 and 41 for allowing the mirrors to pivot about two orthogonal axes F and G lying within the reflection plane of each of the mirrors.

More specifically, there is provided an arrangement of a vertical d.c. motor 51 and a horizontal d.c. motor 53 having appropriate means, such as high gear turn ratio and differential pitch screws 55, 57, to tilt one of the mirrors 31, 33, 35, 37, 39, 41 about the two orthogonal axes F and G, respectively. The relative direction of tilt about each of the axes F and G are controlled by supplying either positive or negative voltages to the motors 51 and 53.

As shown in FIG. 5, instead of the motors 51, 53 and the screws 55, 57 shown in FIG. 4, mirror supporting device 59, 61, 63 may be employed for the mirror tilt adjustment means. Here, the mirror supporting device 59, 61, 63 are mounted on a surface of a mirror supporting plate 65 and arranged at vertices of a triangle to support the mirror 31, (or 33, 35, 37, 39 or 41) thereof. Thus, by projecting or retracting a rod of either one of the devices 59, 61, 63 with respect to a body of the device 59, 61, 63 the tilt angle of the mirror 31 (or 33, 35, 37, 39 or 41) can be adjusted.

Again referring to FIG. 1, an NC device 67 is provided on the laser processing machine 1 to control the translational movements in the respective axial directions of the X-axis carriage 13, the Y-axis carriage 15 and the Z-axis column 17, and to control the rotational movement of the element 19 and the laser processing head 21. A hand box 69 which acts as a teaching box for input of a drive program by a teaching operation or the like is connected to the NC device 67.

In addition, a computer control device 71 for controlling the laser generator 23 and adjusting the mirrors 31, 33, 35, 37, 39, 41 is linked to the NC device 67.

Accordingly, the desired laser processing can be performed by the laser processing machine 1 on a workpiece set under the frame, controlled by the NC device 67 and the computer control device 71.

In this connection, in order to perform laser beam path alignment, a monitor CRT 73 is provided as will be explained in detail hereinafter.

Figure 6:
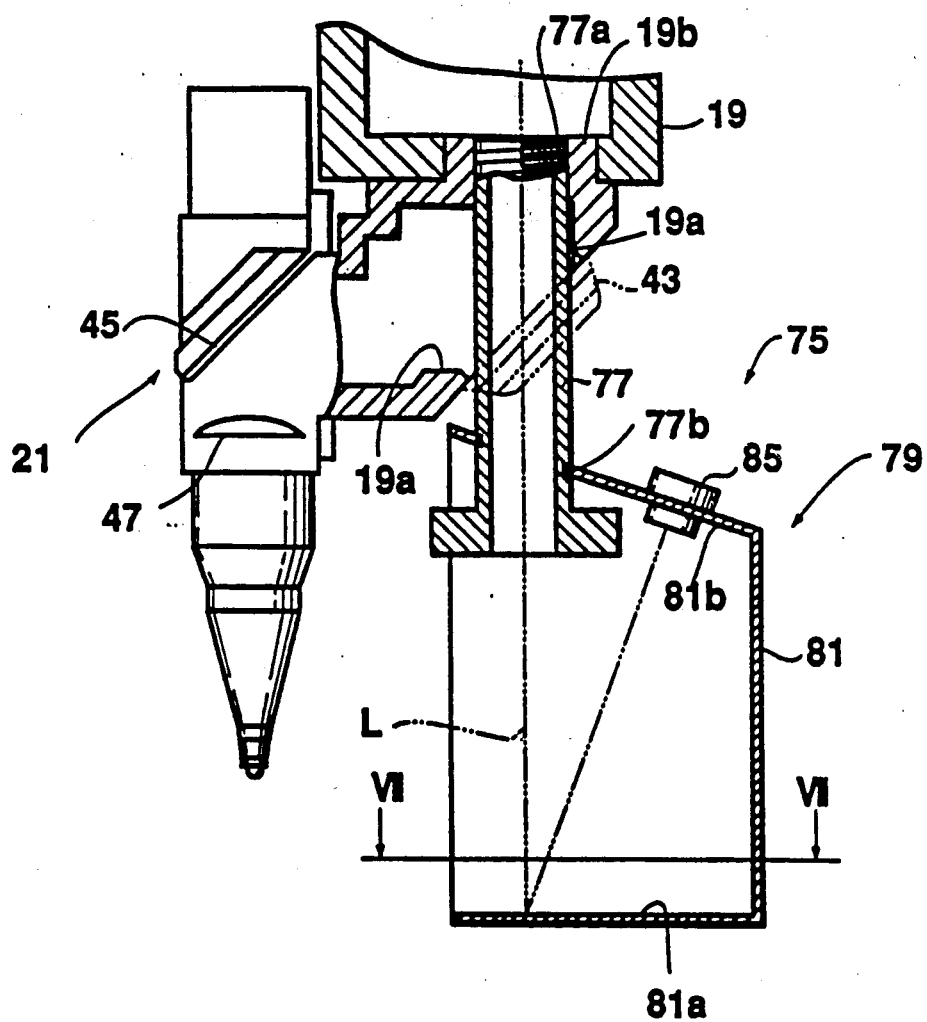
FIG. 6 is an explanatory drawing of one example of a laser beam position detection device.

Now referring to FIG. 6, a laser beam position detection means 75 is detachably mounted on the elements 19 to detect the position of the laser beam (a lateral position in the direction perpendicular to the direction of advance) close to the laser processing head 21 when the laser beam path is being aligned.

More specifically, a head mirror 43 is installed in a freely mountable and dismountable manner at a mounting hole 19a formed in the element 19. A threaded mounting section 19b for installing the laser beam position detection means 75 in a freely mountable and dismountable manner is formed in the element 19.

Thus, when the laser beam position detection means 75 is mounted on the element 19, after the head mirror 43 is removed a mounting cylinder 77 of the detection means 75 is inserted into the mounting hole 19a, and the head section 77a of the mounting cylinder 77 is screwed into the threaded mounting section 19b. A body of the detection means 79 is then mounted on the mounting cylinder 77. Specifically, an engaging section formed in the body 79 detachably engages an engaging groove 77b formed in the periphery of the lower part of the mounting cylinder 77.

Figure 7:
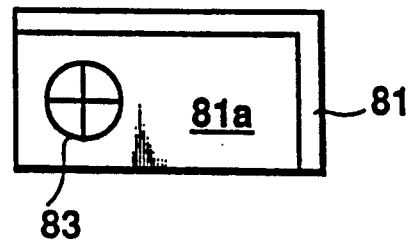
FIG. 7 is a sectional drawing showing the section VII—VII of FIG. 6, viewed in the direction of the arrows.

Referring to FIG. 7, a target mark 83 is formed on a lower surface 81a of the frame 81 of the body 79 onto which the laser beam (visible laser beam such as He-Ne laser beam) L from the element 19 is directed. Accordingly, it is possible to ascertain the alignment status of the laser beam path by detecting the position of the beam with respect to the target mark 83.

A CCD camera 85 is provided on an upper surface 81b of the frame 81 to detect the position of the beam directed at the target mark 83. The upper surface 81b of the frame 81 is provided at an inclination with respect to the lower surface 81a so that the optical axis of the CCD camera 85 passes through the center of the target mark 83.

Accordingly, by processing signals from the CCD camera 85, it is possible to detect whether or not the laser beam L is correctly directed onto the center position of the target mark 83.

When the head mirror 43 is once again mounted on the element 19 after the alignment of the beam path, the mechanical positioning of the head mirrors 43, 45 ensures that the laser beam L, for which the position was aligned with respect to the laser beam position detection device 75, impinges onto the center of the focusing lens 47 through the other head mirror 45.

Figure 8:
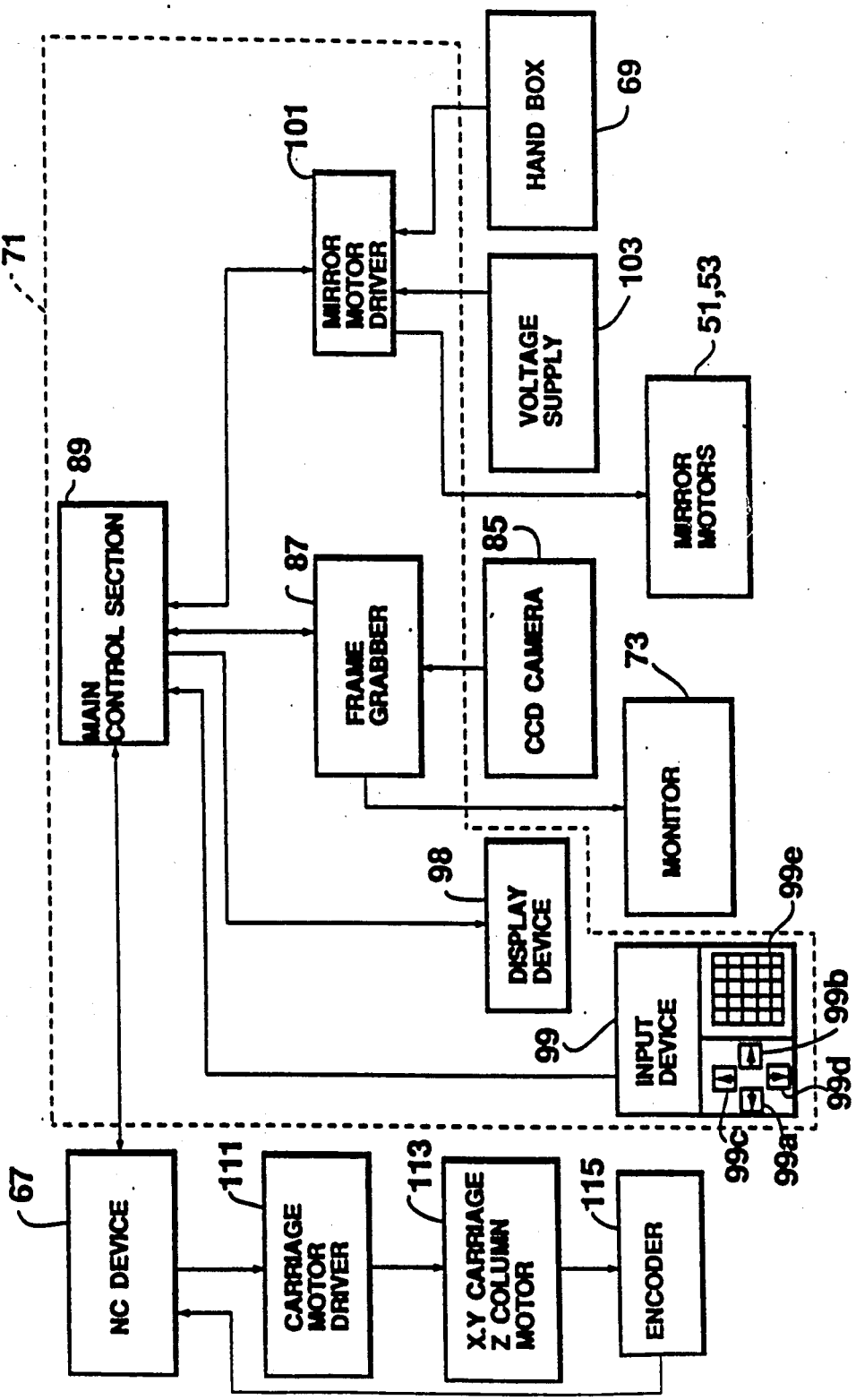
FIG. 8 is a block diagram of one embodiment of a laser beam path alignment apparatus of the present invention.

Now referring to FIG. 8, the laser beam path alignment apparatus includes the computer control device 71 as a control section. The device 71 is so arranged as to receive the detection signal from the CCD camera 85, and adjust the direction of the mirrors 31, 33, 35, 37, 39, 41.

More specifically, the signal from the CCD camera 85 of the laser beam position detection device 75 is processed into an image by a frame grabber 87 provided in the device 71. The image from the frame grabber 87 is sent to the main control section 89 and to a monitor 73.

Accordingly, by observing the monitor 73 it is possible to detect the position of the laser beam relative to the target mark 83.

Now referring to FIG. 9, in the main control section 89, there are provided a beam position/profile calculation section 93, and a first and a second beam position/profile storing section a 95, 97. In the beam position/profile calculation section 93, the beam center position and the peripheral coordinates of beam profile with respect to the target mark 83 (hereinafter referred to as the beam position and beam profile respectively) are calculated, based on the image signal from the frame grabber 87. Then, the calculated beam position and profiles are stored in the order of calculation in a first beam position/profile storage section 95 or in a second beam position/profile storage section 97.

Again referring to FIG. 8, the first beam position and profile and the second beam position and profile stored in the storage sections 95, 97 respectively are displayed on a display device 98 as required.

In the computer control device 71, an input device 99 is provided to adjust the orientation of the mirrors 31, 33, 35, 37, 39, 41 when the laser beam position displayed on the monitor 73 has strayed from the desired position; to adjust the orientation of the mirrors 31, ... 41, the input device 99 outputs an adjustment signal to the vertical motor 51 and the horizontal motor 53 provided on each mirror.

Here, for example, the vertical motor 51 can be rotated in the clockwise or counterclockwise directions by pressing a pair of arrow-marked keys 99a, 99b arranged parallel pointing in the left and right directions; and the horizontal motor 53 can be rotated in the clockwise or counterclockwise direction by pressing a pair of arrow-marked keys 99c, 99d arranged parallel and in the up and down directions.

Further, either one of the mirror motors 31, 33, 35, 37, 39, 41 can be selectively driven by a signal from the input device 99, i.e. a signal produced by pressing a suitable number key 99e.

A mirror motor drive section 101 is provided in the device 71 to drive any of the adjustment motors 51, 53 of the mirrors 31, 33, 35, 37, 39, 41 on receipt of an instruction signal from the input device 99 through the main control section 89.

Now referring to FIG. 10, an automatic/manual change over switch 105 and relay 107 are provided in the mirror motor drive section 101 between a voltage supply source 103 and the mirror motors 51, 53. The relay 107 switches on or off the motors 51, 53 in accordance with a signal from the main control section 89. Further, a manual push button switch 109 is provided between the relay 107 and the main control section 89.

To drive the mirror motors 51, 53, the computer 71 is caused to be activated and the push button switch 109 is caused to be depressed.

Accordingly, in this embodiment of the present invention, if the push button switch 109 is not depressed, the mirror motors 51, 53 are not operated, so there is no concern about incorrect operation of the mirror motors, even if a false signal is sent out from the main control section 89.

Again referring to FIG. 8, the hand box 69 is connected to the mirror motor drive section 101. The hand box 69, by suitable operation, is able to perform manual operation of the mirror motors 51, 53.

Accordingly, the operator can adjust the mirrors by the hand box 69 while verifying the actual laser beam position from the side of the element 19 on which the laser beam position detection device 75 is provided.

As shown in FIG. 8, the NC device 67 is connected to the computer control device 71. An X- or Y-axis carriage motor or Z-axis column motor 113 is also connected to the NC device 67 through a carriage motor drive section 111. The motor 113 is equipped with a suitable encoder 115, the output of which is input to the NC device 67.

Accordingly, the main control section 89 can act in cooperation with the NC device 67. In addition, the amount of movement of the X-axis carriage 13, the Y-axis carriage 15, and the Z-axis column 17 can be calculated, based on the output from the encoder 115.

Figure 11B:
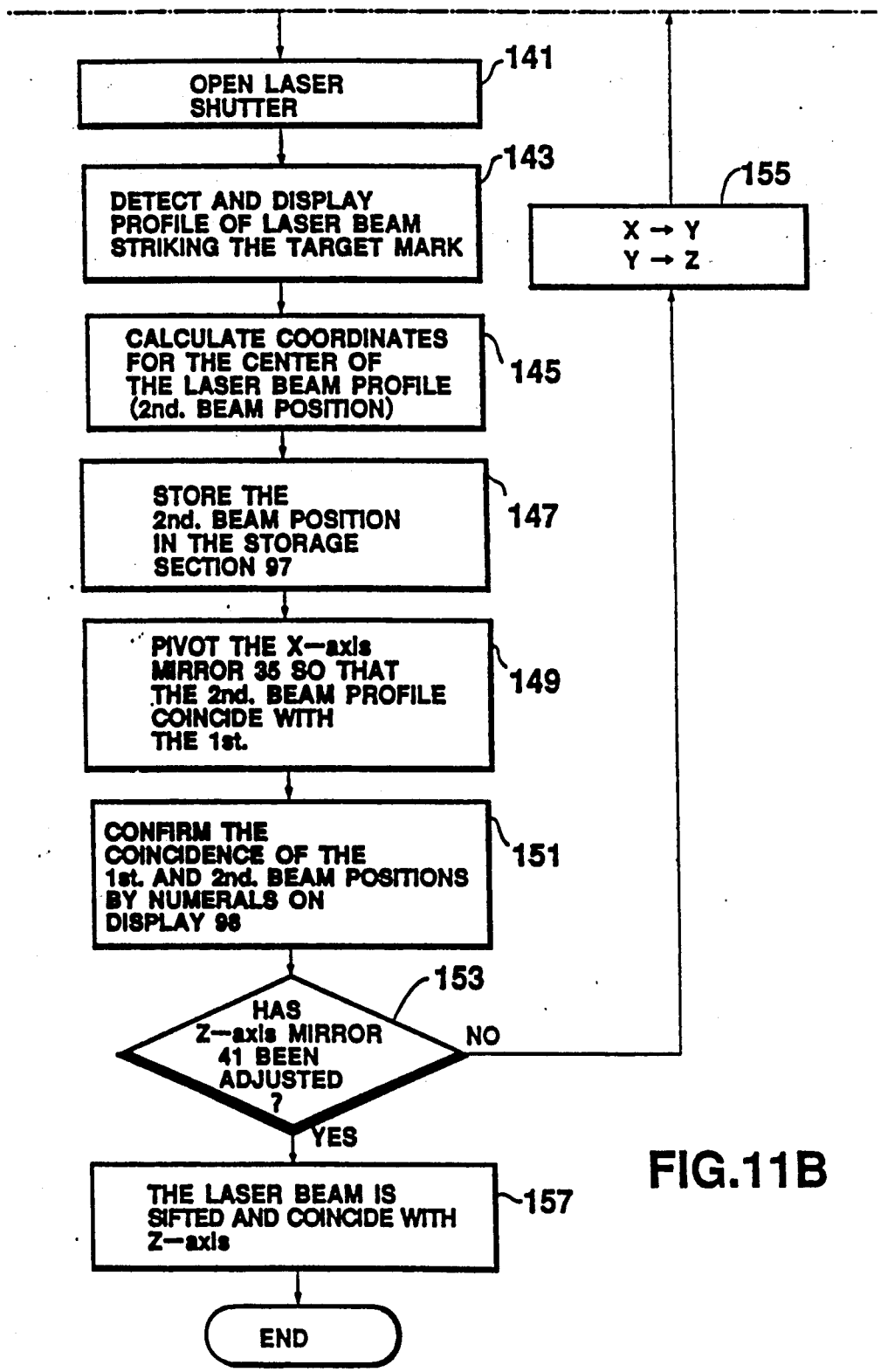
FIG. 11 is a flowchart showing the operation of a first embodiment of the present invention.

Now referring to FIG. 11, the method of aligning the laser beam L with respect to the X-, Y-, and Z-axes will be explained. Through this method the laser beam L is aligned with respect to the X-, Y-, and Z-axes and impinges onto the center of the focusing lens 47 on the processing head 21.

In Step 121, the laser beam position detection device 75 is mounted on the element 19.

In Step 123, a rough adjustment of the mirrors is performed manually using the hand box 69 and the like.

In Step 125, the X-axis carriage 13 is moved to the position closest to the expander 33 and the collimator 35 (the rear end position in FIG. 1).

In Step 127, the shutter (omitted from the drawing) of the laser generator 23 is opened and the laser beam L is emitted, the laser beam being a visible laser beam such as a He-Ne laser beam.

In Step 129, the laser beam profile of the laser beam striking the target mark 83 is detected by the laser beam position detection device 75, and then the target mark 83 and the laser beam profile are displayed on the monitor 73.

In Step 131, the center position coordinates and the peripheral coordinates (first beam position and first beam profile) of the projected laser beam profile are calculated with respect to the cross line of the target mark 83.

In Step 133, the first beam position and the the first beam profile calculated in Step 131 are stored in the storage section 95.

Figure 12:
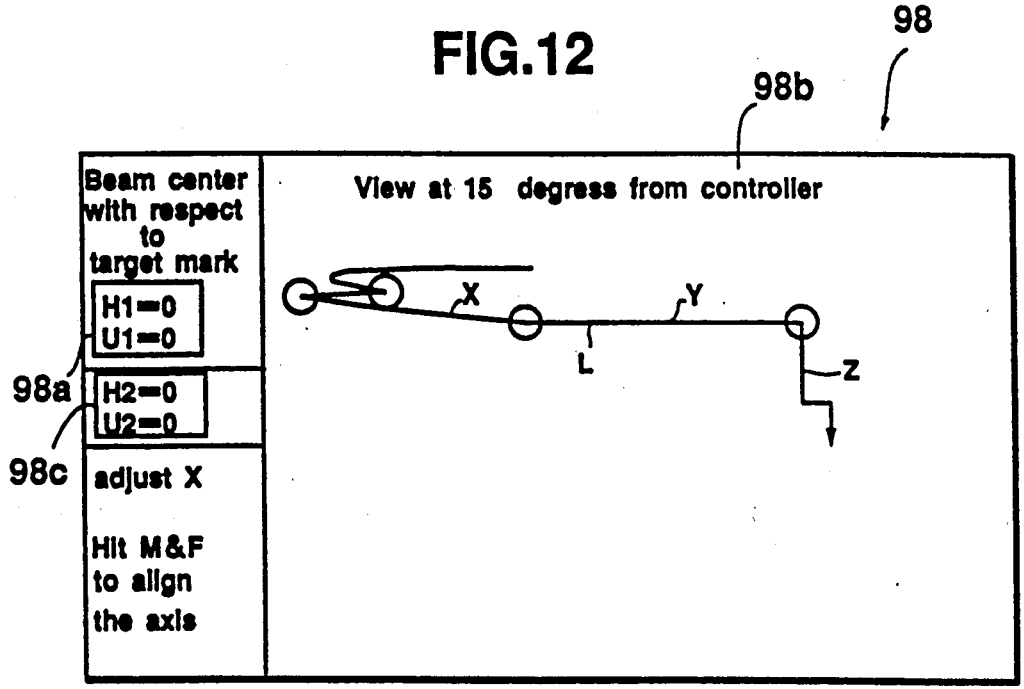
FIG. 12 is an explanatory drawing showing a display on a display device during the operation of the first embodiment of the present invention.
Figure 13:
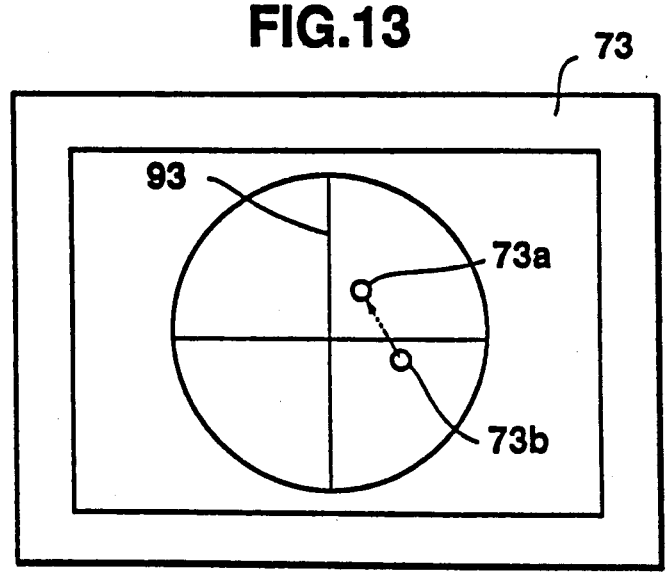
FIG. 13 is an explanatory drawing showing a display on a monitor CRT during the operation of the first embodiment of the present invention.

In Step 135, the first beam position calculated in Step 131 is digitally displayed in a display section 98a of the display device 98, as shown in FIG. 12, and the first beam profile (a peripheral profile) 73a is reproduced on the monitor 73, as shown in FIG. 13. However, it is not essential that the first beam profile 73a be reproduced on the monitor 73; it may instead be reproduced on the display device 98.

In addition, a three dimensional positioning of the path of the laser beam L is shown in simulation in a display section 98b of the display device 98 while aligning the laser beam.

Again referring to FIG. 11, in Step 137 the laser shutter is closed.

In Step 139 the X-axis carriage 13 is moved to the position farthest from the expander 33 and collimator 35 (the most forward end position in FIG. 1).

In Step 141, the laser shutter is once again opened.

In Step 143, the projected laser beam profile is detected and displayed.

In Step 145, the coordinates of the center of the laser beam are calculated as the second beam position.

In Step 147, the second beam position is stored in the storage section 97.

In Step 149, the operator causes the motors 51, 53 of the X-axis mirror 35 to rotate in the appropriate direction by pressing the appropriate arrow-marked keys 99a, 99b, 99c, 99d on the input device 99 so that the first beam profile 73b moves to coincide with a first projected beam 73a on the monitor 73 (see FIG. 13).

Here, the arrow-marked keys 99a, 99b, 99c, 99d on the input device 99 are connected to the motors 51, 53 provided on the X-axis mirror 35 so that the direction of the arrow of a pressed key corresponds with that of a movement of the beam profiles on the display. Accordingly, when the arrow-marked keys 99a, 99b in FIG. 8 are pressed, the second projected beam 73b in FIG. 13 moves horizontally and when the arrow-marked keys 99c, 99d in FIG. 8, are pressed the second projected beam 73b in FIG. 13 is moved vertically. Thus to move the second projected beam 73b to the left and upward so as to cause it to approach the first projected beam 73a in FIG. 13, the arrow-marked keys 99a, 99c is pressed.

Also, the amount of rotation of the motors 51, 53 is determined by the amount of time the arrow-marked keys 99a, 99c are kept depressed. Accordingly, in order for the second projected beam 73b to approach the first projected beam 73a as shown in FIG. 13 it is necessary for the upward-facing arrow-marked key 99c to be depressed for about twice the length of time that the left-facing arrow-marked key 99a is depressed.

Again referring to FIG. 11, if the two beam profiles approximately coincide on the monitor 73, in Step 151 the coincidence of the two beam profiles is confirmed by the coordinate values of the first and second beam positions on display section 98a, 98c (FIG. 12). In the case where the difference in the values of the two sets of coordinates is not below a specified permitted value, minute adjustments are made by again pressing the arrow-marked keys 99a–99d.

Accordingly, if the difference between the coordinate values shown in the section 98a, 98c comes to be below a specified permitted value, the adjustment of the X-axis mirror 35 is completed and the program proceeds to Step 153.

Here, it should be noted that if the laser beam L is aligned with the X-axis, the projected beam position must not move, even when the X-axis carriage 13 moves along the axis guide sleeve 7. Therefore, through steps 125-151 the laser beam L, which runs along the X-axis, is now aligned with the X-axis.

In Step 153, it is determined whether or not the adjustment of the Z-axis mirror 41 has been completed. If the adjustment has not been completed the program proceeds to Step 155 where the X coordinate are replaced with Y coordinate and the program returns to Step 125.

If the actions in Steps 125-149 with respect to the adjustment of the Y-axis and Z-axis mirrors are executed and the adjustment of the Z-axis mirror is completed, the program proceeds from Step 153 to Step 157.

After the adjustment of the Z-axis mirror, if the projected beam position deviates from the center of the target mark 83, in Step 157 the operator, while viewing the image on the monitor 73, for example, rotates the mirrors 31 and 33 (or mirror 39) by a suitable amount, and moves the projected beam position to the center of the target mark 83. The fact that the light beam can be moved in parallel toward a lateral position with respect to the direction of advance by adjusting the angles of two mirrors is commonly known and therefore an explanation is omitted.

Figure 14:
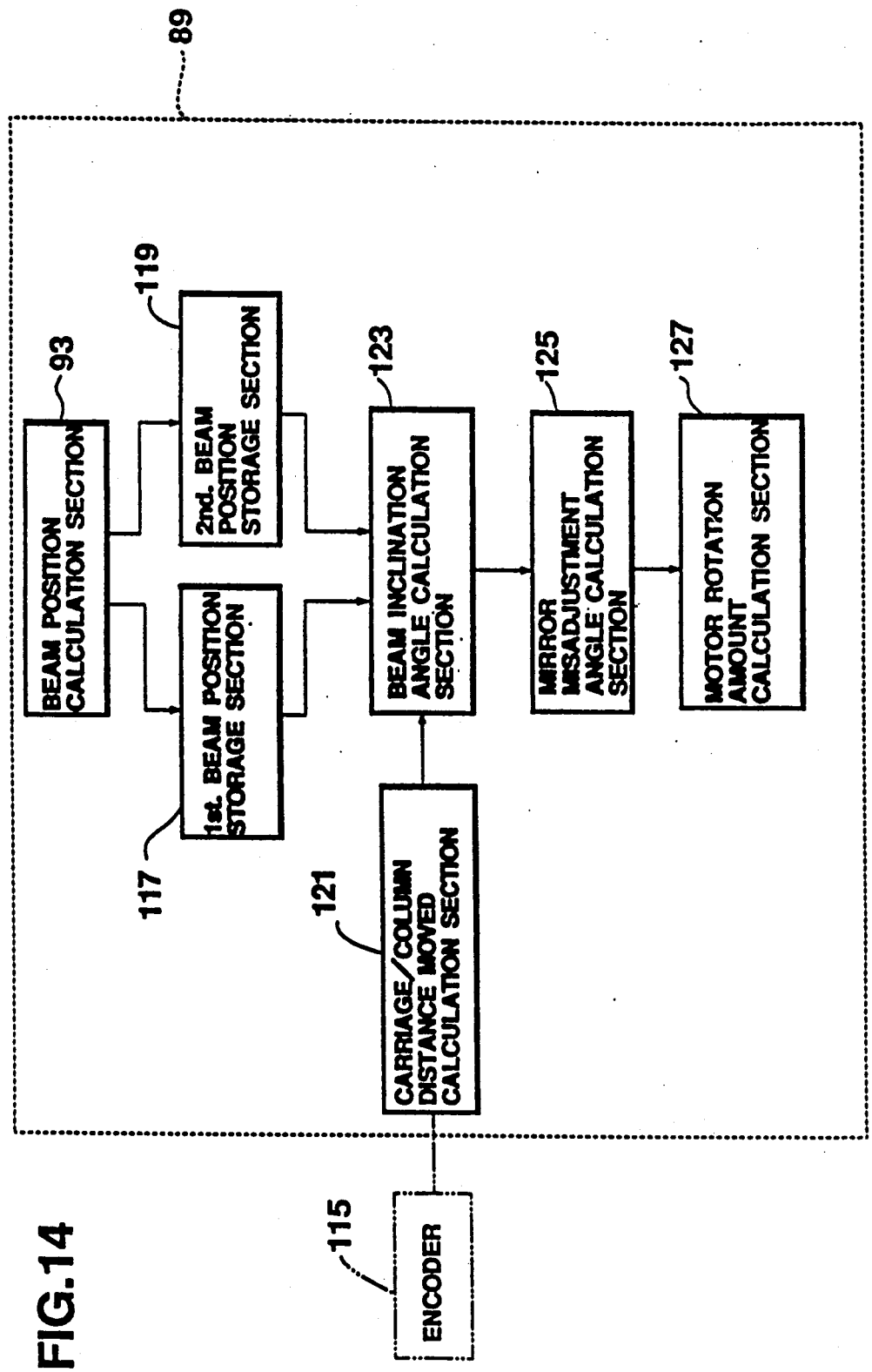
FIG. 14 is a block diagram showing a second embodiment of the main control section of the apparatus of FIG. 8.

FIG. 14 shows a second embodiment of the main control section 89 of the present invention. First, in the same way as in the main control section of the first embodiment, the center position of the projected beam (beam position) is calculated by the beam position calculation section 93.

The beam center position calculated by the beam position calculation section 93 is stored in a first beam position storage section 117 or in the second beam position storage section 119; when the X- and Y-axis carriages 13, 15 and the Z-axis column 17 are moved to positions closest to the expander 33 and the collimator 35, the detected beam center positions are stored in a first beam position storage section 117; and when the X- and Y-axis carriages 13, 15 and the Z-axis column 17 are moved to positions furtherst from the expander 33 and the collimator 35, the detected beam center positions are stored in a second beam position storage section 119.

Based on a pulse from an encoder 115 mounted on a motor 113 for the X- and Y-axis carriages or the Z-axis column, the distance moved by the X- and Y-axis carriages 13, 15 or the Z-axis column 17 is calculated by a carriage/column distance moved calculation section 121.

Based on the distance moved by the X- and Y-axis carriages 13, 15 or the Z-axis column 17 obtained from the distance moved calculation section 121, and the projected beam position obtained from the first and second beam position storage sections 117, 119, the angle of inclination θ of the laser beam L relative to the X-, Y-, and Z-axes is calculated by a beam inclination angle calculation section 123.

The method of calculation will now be briefly explained. For example, as shown in FIG. 15, the path of the laser beam L is assumed to be at an angle of inclination relative to the Z-axis (it is assumed here that the alignments for the X-axis and for the Y-axis have been completed).

Figure 15:
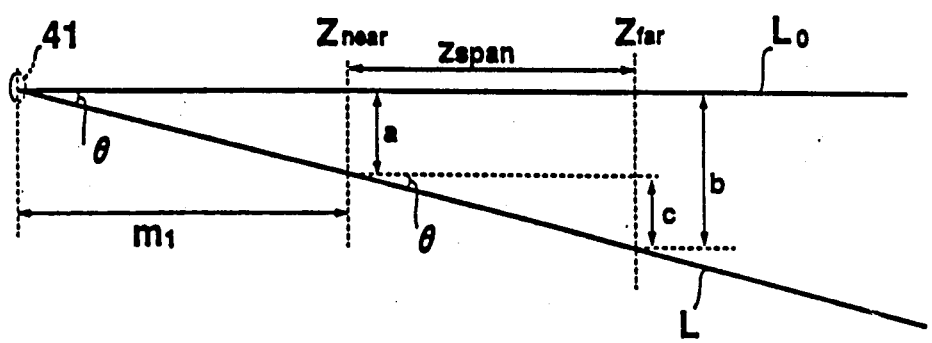
FIGS. 15 to FIG. 18 are explanatory drawings showing the principle of calculation of the angle of inclination of a laser beam path with respect to the X-, Y-and Z-axis, in the second embodiment shown in FIG. 14.

In FIG. 15, in place of the Z-axis a virtually aligned beam Lo is drawn in which the beam alignment with respect to the Z axis has been completed. The existing laser beam (misaligned laser beam) L is drawn as a beam inclined at an angle θ with respect to the virtual beam Lo. Both beams are reflected by the Z-axis mirror 41 at the same point, but, in advancing to the right in FIG. 15, the virtual beam Lo is maintained parallel to the Z-axis and the misaligned beam L is separated from the beam Lo.

It is further assumed that when the Z-axis column 17 is elevated to the highest end, the Z coordinate of the target mark 83 is $Z = Z_{near}$, and when the Z-axis column 17 is lowered to the lowest end, the Z coordinate of the target mark 83 is $Z = Z_{far}$; thus, in FIG. 15, a sign "$m_1$" refers to a distance between the height of the Z-axis mirror 41 and that of the target mark 83 when the Z-axis column 17 is elevated to the highest end. Then, if the deviation between the two beams L, Lo is "a" at $Z_{near}$ and "b" at $Z_{far}$, the angle of inclination can be obtained from the following expression.

$$\tan \theta = \frac{b - a}{Z_{far} - Z_{near}} = \frac{c}{Z_{span}} \qquad (1)$$

where $c = b - a$, and $Z_{span}$ represents the amount of movement from the highest end of the Z-column to the lowest.

In the Eq. (1), it should be noted that the difference $c (= a - b)$ is equal to the difference between the first and the second beam positions stored in storage sections 117 and 119. Thus the angle of inclination θ of the laser beam L relative to Z-axis is calculated by the beam inclination angle calculation section 123, based on $Z_{span}$ obtained from the section 121, and the first and the second beam positions obtained from the storage sections 117 and 119.

Figure 16:
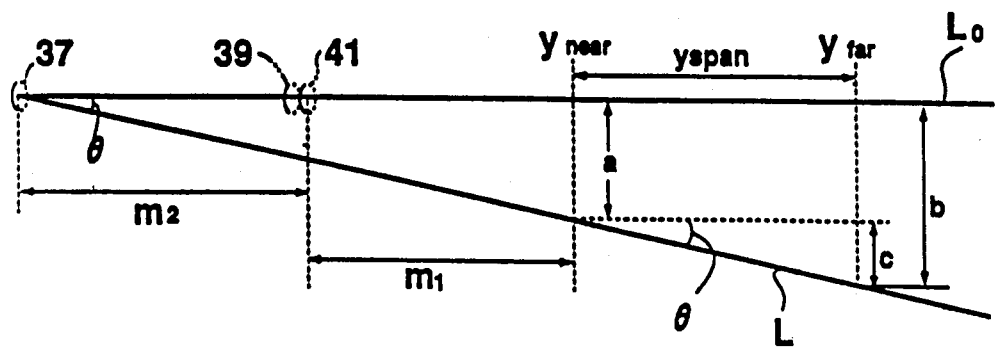

Referring to FIG. 16, in order to explain the method of calculating the angle of inclination of the beam to the Y-axis, a virtually aligned beam Lo is again considered in which the beam alignment with respect to the Y-axis has been completed (it is assumed that the alignment for the X-axis has been completed).

In FIG. 16, it should be noted that figures on the right of the Z-axis mirror 41 represent virtual images by the mirror 41, and those on the right of the displacement mirror 39 represent virtual images by the mirror 39. Thus, as is well known, the beam paths L and Lo on the right of the mirrors 41 and 39 always lie on an extended lines of corresponding beam paths on the left of the mirrors 41 and 39, irrespective of directions of the orientations of the mirrors 39 and 41.

Accordingly, in the virtual images, the virtually aligned beam Lo is extended as a straight line parallel to an extension of the Y axis. Also, the misaligned laser beam L is extended along a straight line at an angle θ to the beam Lo.

A virtual image to the target mark 83 of the laser beam position detection device 75 is also positioned on the extension line (in the virtual space).

Accordingly, the calculation of the angle of inclination of the beam relative to the Y axis is performed in the same way as previously outlined. That is to say, it is assumed that the Y coordinate (in the virtual space) of the target mark 83, when the Y-axis carriage 13 is moved to the left end in FIG. 1, is $Y = Y_{near}$, and when the Y-axis carriage 13 is moved to the right end in FIG. 1, the Y coordinate (in the virtual space) of the target mark 83 is $Y = Y_{far}$. In this connection, in FIG. 16, a sign "$m_2$" refers to an optical distance between the Y-axis mirror 37 and the Z-axis mirror 41. Now, if the deviation between the two beams L, Lo is "a" al $Y_{near}$, and "b" at $Y_{far}$, the angle of inclination of the misaligned beam L can be obtained from the following expression.

$$\tan\theta = \frac{b-a}{Y_{far} - Y_{near}} = \frac{c}{Y_{span}} \quad (2)$$

where $c = b - a$ and $Y_{span} = Y_{far} - Y_{near}$. As was explained before, the difference $c = (b-a)$ equals the difference between the first beam position and the second beam position, both of which are obtained, when the Y-axis carriage is moved to the position where $Y = Y_{near}$ and $Y = Y_{far}$, and stored in the storage sections 117, 119.

Therefore, the angle $\theta$ of inclination of the beam L to the Y-axis is also calculated in the calculation section 123 based on the data from the calculation section 121 and the storage sections 117 and 119.

Figure 17:
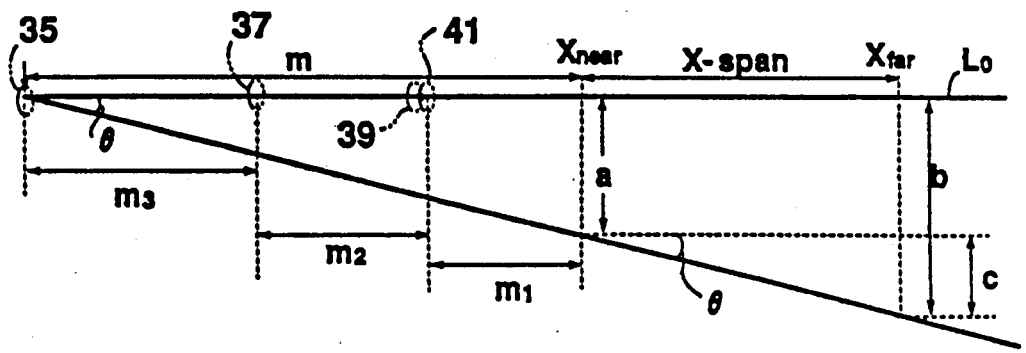

In the same way, as shown in FIG. 17, the angle of inclination of the misaligned beam L for the X axis can be obtained from the expression.

$$\tan\theta = \frac{b-a}{X_{far} - X_{near}} = \frac{c}{X_{span}} \quad (3)$$

where $c = b - a$ and $X_{span} = X_{far} - X_{near}$. Incidentally, in FIG. 16, a sign "$m_3$" refers to an optical distance between the X-axis mirror 35 and the Y-axis mirror 37.

Once again referring to FIG. 14, the misadjustment angles of the mirrors are calculated in a mirror misadjustment angle calculation section 125 based on the angle of inclination of the beam to each axis calculated in the section 123.

Figure 18:
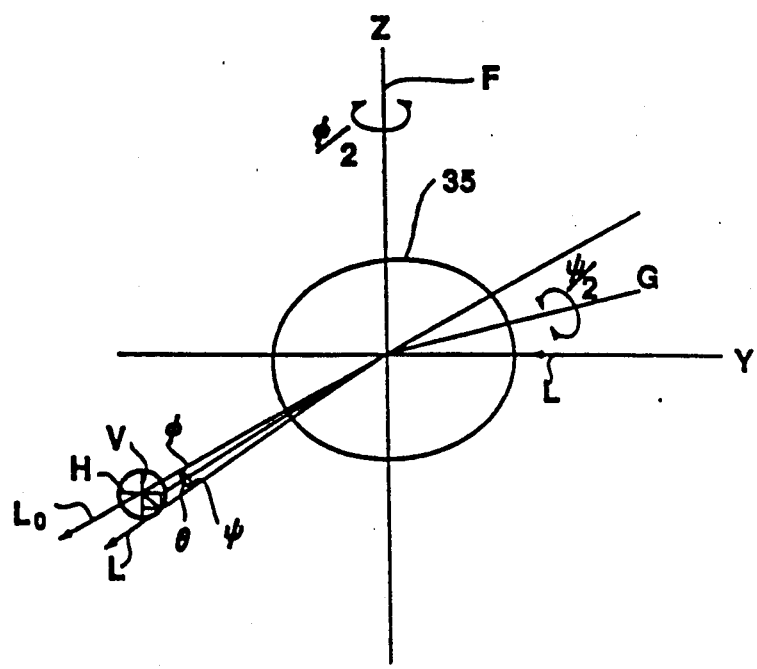

For example, as shown in FIG. 18, the laser beam L which is reflected by the X-axis mirror 35 toward the X-axis is inclined at an angle $\theta$ with respect to the virtually aligned beam Lo, path which is parallel to the X-axis. Further, as shown in FIG. 18, the laser beam L is inclined at an angle $\phi$ in the horizontal direction, and also it is inclined at an angle $\psi$ in the vertical direction. In this case, the misadjustment angle of the X-axis mirror 35 is calculated as $\phi/2$ about a vertical axis (the F-axis) and $\psi/2$ about a horizontal axis (the G-axis).

There are cases where the actual horizontal and vertical directions slightly differ from the directions of the mutually perpendicular lines (cross) on the target mark 83. Accordingly, in the calculation of the angles of inclination in the horizontal direction and in the vertical direction, it is desirable that, in advance, the X-axis mirror 35, for example, is swung through a very small angle about the axis F and, the movement of the beam impinging on the target mark 83 is observed, to determine the actual horizontal direction relative to the cross on the target mark 83.

Again referring to FIG. 14, the amount of rotation of the vertical and horizontal motors provided on the X-, Y-, and Z-axis mirrors 35, 37, 41 is calculated in a motor rotation amount calculation section based on the misadjustment angle of the mirror calculated in the section 125.

Figure 19B:
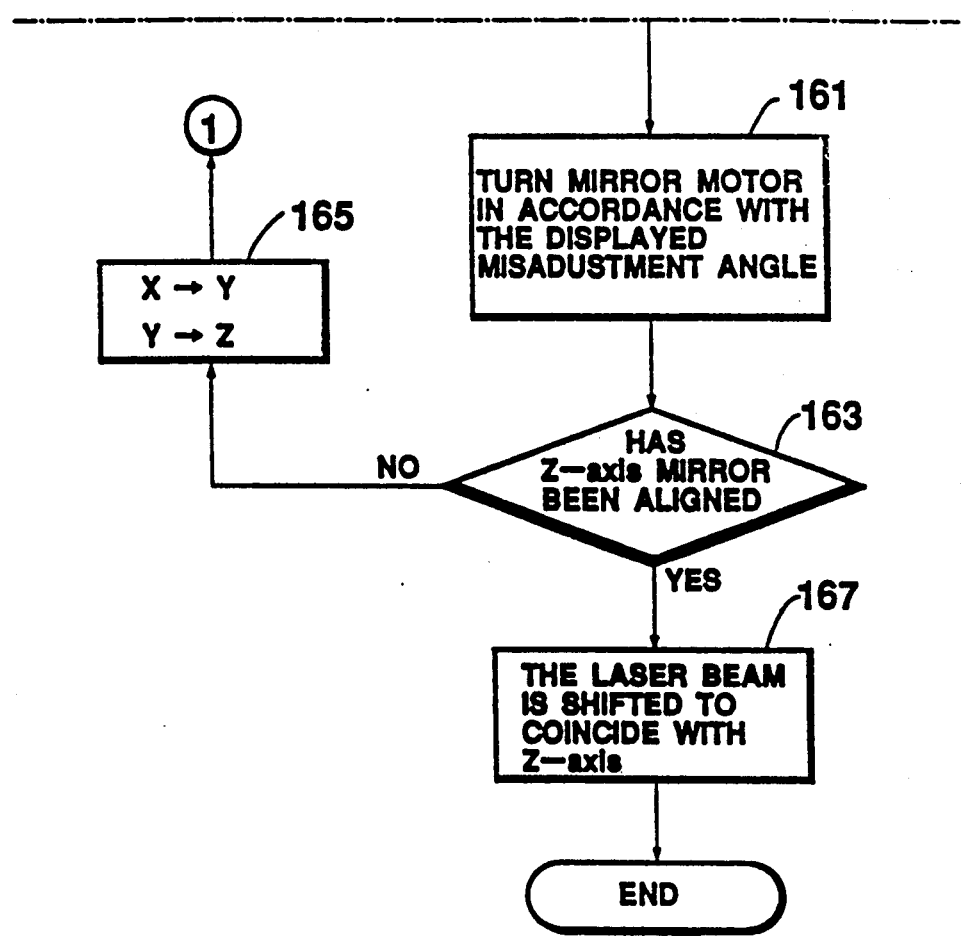

Now referring to FIG. 19, in order to actually adjust the mirrors by making use of the second embodiment of the present invention, in Step 131 the laser beam position detection device 75 is mounted on the element 19, and in Step 133, a rough alignment of the mirrors is performed manually.

Next, in Step 135, the Y-axis carriage 15 is positioned almost at the center of the X-axis carriage 13; the Z-axis column 17 is secured at its highest position; and the X-axis carriage 13 is moved to the position closest to the expander 33 and the collimator 35.

In Step 137, the shutter of the laser generator 23 is opened for allowing the visible laser beam to be emitted.

In Step 139, the X-axis mirror 35 is swung through a very small angle in, for example, the horizontal direction, and a horizontal axis H and a vertical axis V are determined on the target mark 83.

In Step 141, a beam profile projected on the target mark 83 is detected, and the coordinate of its center position (the first beam position) is calculated for the horizontal axis H and the vertical axis V.

In Step 143, the first beam position is stored in the first beam position storage section 117.

In Step 145, the shutter of the laser generator 23 is closed.

In Step 147, the Y-axis carriage 15 and the Z-axis column 17 are secured in their existing positions and the X-axis carriage 13 is moved to the position farthest from the expander 33 and the collimator 35.

In Step 149, the shutter of the laser generator 23 is again opened.

In Step 151, the second beam profile is detected and the coordinates of its center position (the second beam position) are calculated.

In Step 153, the angle of inclination $\theta$ of the laser beam with respect to the X axis are calculated, based on the amount of movement of the X-axis carriage $X_{span}$ and on the values of the first and the second beam positions, as follows:

$$\tan\theta = \frac{b-a}{X_{near} - Y_{far}} = \frac{c}{X_{span}}.$$

In Step 155, the misadjustment angles $\phi/2$, $\psi/2$ of the X-axis mirror 35 are calculated.

In Step 157, the amount of rotation of the X-axis mirror motors 51, 53 is calculated.

In Step 159, the misadjustment angles $\phi/2$, $\psi/2$ of the X-axis mirror 35 are displayed on the display device 98.

In Step 161, the operator inputs the misalignment angles $\phi/2$, $\psi/2$ from the input device 99 in accordance with the display of Step 159, and the X-axis mirror motors 51, 53 are caused to rotate. The adjustment angles $\phi/2$, $\psi/2$ can be input through the numerical keys 99e of the input device 99.

In Step 163, it is determined whether or not the adjustment of the Z-axis mirror has been completed. If the adjustment has not been completed the program proceeds to Step 165 where the axis being treated is changed from the X axis to the Y axis.

The above actions are repeated for the Y-axis mirror and the Z-axis mirror. When the Z-axis mirror adjustment has been completed the program proceeds to Step 167.

In Step 167, the laser beam is moved parallel to the Z-axes so as to be made to coincide with the Z axis.

By means of this embodiment of the present invention, the laser beam is precisely aligned with the X-, Y- and Z-axis, since the X-, Y- and Z-axis mirrors are adjusted based on the precisely detected inclination angle of the laser beam L with respect to the X-, Y- and Z-axis.

What is claimed is:

1. A laser beam path alignment apparatus for a laser processing machine that is provided with a laser generator, a laser processing head for performing laser processing, a means for moving the laser processing head in a predetermined axis direction, and a mirror for guiding a laser beam from the laser generator to the laser processing head, comprising:

means for detecting a laser beam position through which the laser beam passes, the laser beam position being defined in a plane perpendicular to the predetermined axis direction;

means for storing a first laser beam position which is detected by the laser beam position detecting means in the case where the moving means is positioned at a first position in the predetermined axis direction;

means for displaying the first laser beam position and a second beam position, the second laser beam position being detected by the laser beam position detecting means in the case where the moving means is positioned at a second position in the predetermined axis direction; and means for rotating the mirror about an axis lying in the surface of the mirror, whereby the second laser beam position is changed to coincide with the first laser beam position.

2. The apparatus of claim 1, wherein the moving means is either one of X-axis carriage, Y-axis carriage or Z-axis column.

3. The apparatus of claim 1, wherein the display means is a monitor CRT for graphically displaying the first and the second laser beam position.

4. The apparatus of claim 1, wherein the display means is a display device for digitally displaying the first and the second laser beam position.

5. A laser beam path alignment apparatus for a laser processing machine that is provided with a laser generator, a laser processing head for performing laser processing, means for moving the laser processing head in a predetermined axis direction, and a mirror for guiding a laser beam from the laser generator to the laser processing head, comprising:

means for detecting a laser beam position through which the laser beam passes, the laser beam position being defined in a plane perpendicular to the predetermined axis direction;

means for storing a first laser beam position and a second laser beam position, the first laser beam position being detected by the laser beam position detecting means in the case where the moving means is positioned at a first position in the predetermined axis direction and the second laser beam position being detected by the laser beam position detecting means in the case where the moving means is positioned at a second position in the predetermined axis direction;

means for calculating the distance between the first position and the second position of the moving means; and means for calculating an inclination angle of the laser beam with respect to the predetermined axis direction, based on the distance between the first and the second position of the moving means and the first and the second laser beam position.

6. The apparatus of claim 5, further comprising means for rotating the mirror about an axis lying in the surface of the mirror, in accordance with the inclination angle of the laser beam with respect to the predetermined axis direction, to align the laser beam path.

* * * * *